(12) United States Patent
Wyles et al.

(10) Patent No.: US 10,012,533 B2
(45) Date of Patent: Jul. 3, 2018

(54) SEMI-ACTIVE LASER (SAL) RECEIVERS AND METHODS OF USE THEREOF

(71) Applicant: Raytheon Company, Waltham, MA (US)

(72) Inventors: Richard H. Wyles, Goleta, CA (US); Michael J. Batinica, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 197 days.

(21) Appl. No.: 14/996,936

(22) Filed: Jan. 15, 2016

(65) Prior Publication Data

US 2017/0205283 A1 Jul. 20, 2017

(51) Int. Cl.
*G01J 1/44* (2006.01)
(52) U.S. Cl.
CPC ..................... *G01J 1/44* (2013.01)
(58) Field of Classification Search
CPC .............. G01J 1/44; G01J 2001/4406; G01J 2001/444; G01S 3/781; G01S 3/783; G01S 3/784; G01S 3/786; G01S 7/4863; G01S 7/4861; G01S 7/4873; G01S 7/4865; G01S 17/003; G01S 17/42; F41G 7/2293; F41G 7/226
See application file for complete search history.

(56) References Cited

U.S. PATENT DOCUMENTS

| | | | | |
|---|---|---|---|---|
| 4,914,286 A | * | 4/1990 | Chirovsky | G02F 3/028 250/214 LS |
| 6,040,568 A | * | 3/2000 | Caulfield | H04N 5/33 250/208.1 |
| 6,392,747 B1 | * | 5/2002 | Allen | G01S 7/4802 356/141.1 |
| 7,193,691 B2 | | 3/2007 | Weber | |

(Continued)

FOREIGN PATENT DOCUMENTS

| | | |
|---|---|---|
| EP | 0326090 A2 | 8/1989 |
| EP | 2843355 A1 | 4/2015 |

(Continued)

OTHER PUBLICATIONS

G.Katulka, D. Lyon, F. Fresconi, D. Petrick, T.G. Horwath, Development and Characterization of Low Cost Seeker Technology for US Army Applications, Dec. 2008.

(Continued)

*Primary Examiner* — John Lee
(74) *Attorney, Agent, or Firm* — Burns & Levinson, LLP; Joseph M. Maraia

(57) ABSTRACT

A circuit for readout from for readout from a focal plane array having a number of pixels, includes, for each one pixel, an adaptive photodetector load circuit coupled to a detector for the one pixel, a trans-impedance amplifier, the detector being AC coupled to the trans-impedance amplifier, a comparator component, receiving an AC coupled output of the trans-impedance amplifier and comparing the AC (Continued)

coupled output to a predetermined threshold, a sample and hold ring comprising a number charge storage components connected in parallel, each one charge storage component comprising a capacitor in series with an enabling three point switching component and a pulse detection logic circuit receiving an output of the comparator component.

13 Claims, 1 Drawing Sheet

(56) References Cited

U.S. PATENT DOCUMENTS

| | | | | |
|---|---|---|---|---|
| 8,779,858 | B2* | 7/2014 | Niederberger | H03F 1/26 330/109 |
| 8,941,069 | B2 | 1/2015 | Gutierrez | |
| 9,635,287 | B2* | 4/2017 | Wyles | H04N 5/343 |
| 2006/0125673 | A1* | 6/2006 | Lee | H03K 4/50 341/155 |
| 2006/0232760 | A1 | 10/2006 | Asbrock et al. | |
| 2009/0078817 | A1 | 3/2009 | Williams | |
| 2010/0066596 | A1* | 3/2010 | Tyree | F41G 7/2213 342/195 |
| 2010/0067608 | A1* | 3/2010 | Tyree | F41G 7/2246 375/285 |
| 2010/0108859 | A1* | 5/2010 | Andressen | H04N 5/335 250/203.2 |
| 2012/0075615 | A1* | 3/2012 | Niclass | G01S 7/4814 356/5.01 |
| 2012/0248288 | A1* | 10/2012 | Linder | F41G 7/008 250/208.1 |
| 2013/0069719 | A1* | 3/2013 | Niederberger | H03F 1/26 330/75 |
| 2013/0088594 | A1* | 4/2013 | Wyles | H04N 5/343 348/144 |
| 2016/0003946 | A1* | 1/2016 | Gilliland | G01S 17/10 356/5.01 |
| 2016/0057366 | A1* | 2/2016 | Lee | H04N 5/3742 348/302 |
| 2016/0294325 | A1* | 10/2016 | Nedovic | H03F 1/0205 |
| 2017/0041571 | A1* | 2/2017 | Tyrrell | H04N 5/335 |
| 2017/0069677 | A1* | 3/2017 | Saruwatari | H04N 5/3745 |
| 2017/0205283 | A1* | 7/2017 | Wyles | G01J 1/44 |

FOREIGN PATENT DOCUMENTS

| | | |
|---|---|---|
| EP | 2963445 A2 | 1/2016 |
| WO | 0077540 A1 | 12/2000 |
| WO | 2009073053 A2 | 6/2009 |
| WO | 2015152297 A1 | 10/2015 |

OTHER PUBLICATIONS

The Development of a Warhead into an Integrated Weapon System to Provide anAdvanced Battlefield Capability, by Anthony Jaines Whelan, Thesis , Submitted to the University of London for the Doctor of Engineering (EngD) Degree.

Jochen Barth, Alfred Fendt, Rolf Florian, and Wolfgang Kieslich, Dual-Mode Seeker with Imaging Sensor and Semi-Active Laser Detector, Proc. of SPIE vol. 6542, 65423B, (2007).

International Search Report and Written Opinion from related PCT Application No. PCT/US2016/048050 dated Nov. 25, 2016.

* cited by examiner

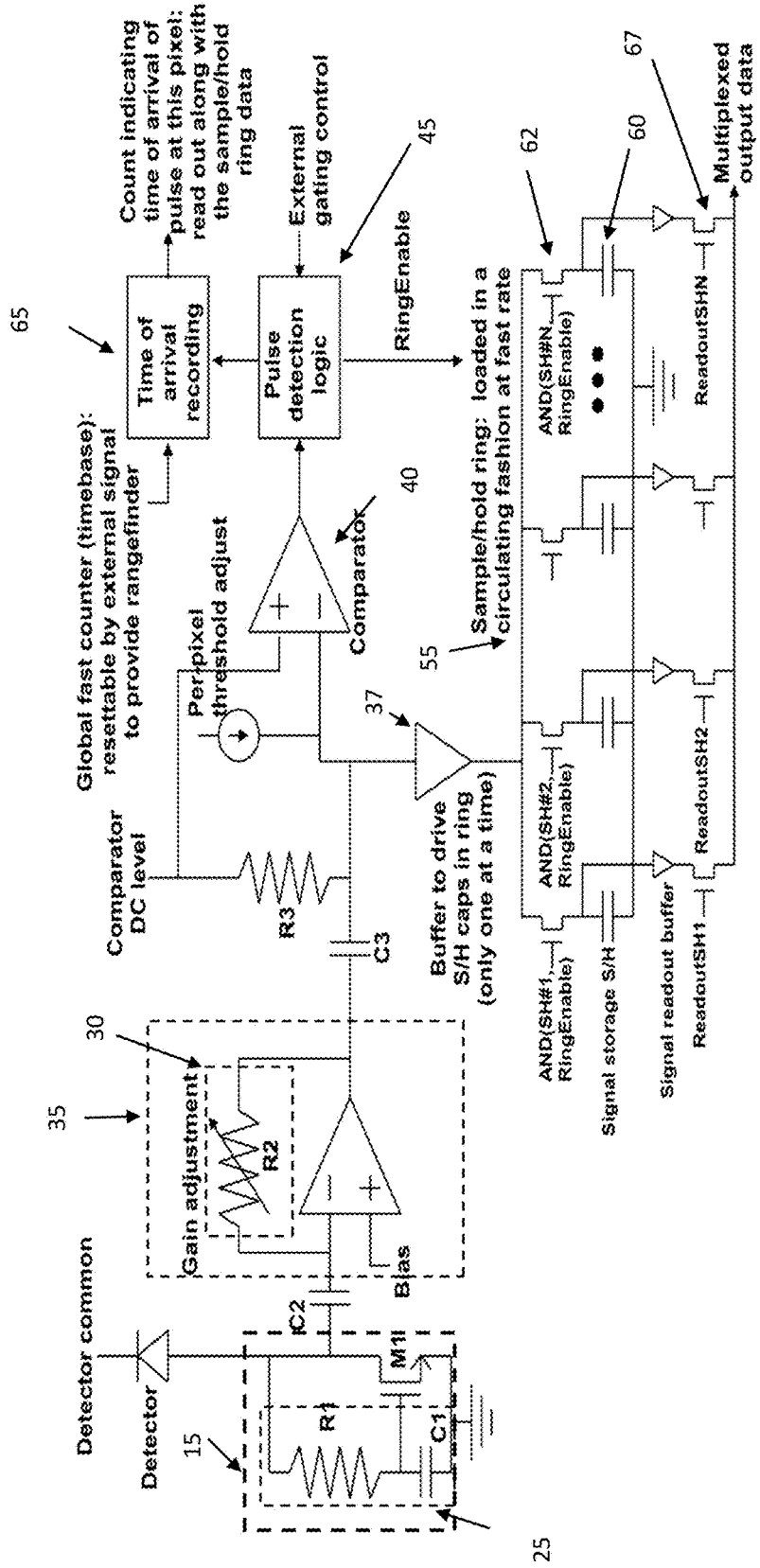

SEMI-ACTIVE LASER (SAL) RECEIVERS AND METHODS OF USE THEREOF

BACKGROUND

These teachings relate generally to semi-active laser (SAL) receivers which are laser spot trackers used in expendable munitions such as laser-guided bombs.

Typical SAL receivers use an analog-to-digital converter (ADC) to continuously digitize the signal from each pixel at high speed to follow the short laser pulse return, and use digital processing to examine the waveform seen by each pixel for laser pulses of interest. This architecture limits the array size to about 2×2. Typical SAL receivers use 2×2 pixel "quadrant" photodetectors to provide information on the alignment of the SAL receiver and bomb relative to the laser spot. One problem with these systems is that the 2×2 pixel array limits the resolution and field of view (FOV) of the sensor. Some systems partially overcome this limitation by adding a gimbal (mechanical panning mechanism) but this adds significant cost to the SAL receiver, which must be inexpensive because they are used in expendable munitions. Existing SAL receivers cannot increase the array size to be much larger than 2×2 because they use an analog-to-digital converter (ADC) to continuously digitize the signal from each pixel at high speed (typically around 100 MHz) to follow the short laser pulse return, and use digital processing to examine the waveform seen by each pixel for laser pulses of interest. Using a larger array size, 32×32=1024 pixels for example, would require 1024 ADC circuits and 1024 digital signal processing channels which would be prohibitive in terms of power, size, and cost.

An additional problem with existing SAL systems are that they use a 1.06 micron laser wavelength, which causes eye damage and is not covert since most current EO sensors including image intensifiers can see this wavelength and thus determine the location of the laser designator. Furthermore, existing SAL systems can experience significant performance degradation when the sun is in the FOV of the sensor.

There is a need for SAL receiver designs that can use large focal plane arrays without exceeding the cost and size limitations There is a further for SAL receiver designs that can enable the use of eye safe lasers.

BRIEF SUMMARY

Receiver designs that can use large focal plane arrays without exceeding the cost and size limitations and that can enable the use of eye safe lasers are disclosed herein below.

In one or more embodiments, the readout circuit of these teachings, for readout from a focal plane array having a number of pixels, includes, for each one pixel in the focal plane array, an adaptive photodetector load circuit coupled to a detector for the one pixel, the adaptive photodetector load circuit having a frequency dependent circuit in parallel with a three point switching component, a third point of the three point switching component being connected to an intermediate point in the frequency dependent circuit, a voltage from the intermediate point to ground providing a switching voltage for the three point switching component, a trans-impedance amplifier, the detector being AC coupled to the trans-impedance amplifier, a comparator component, receiving an AC coupled output of the trans-impedance amplifier and comparing the AC coupled output to a predetermined threshold, a sample and hold ring comprising a number charge storage components connected in parallel, each one charge storage component comprising a capacitor in series with an enabling three point switching component, a third point of the enabling three point switching component receiving a ring enable signal, where a predetermined charge storage component is connected to the AC coupled output of the trans-impedance amplifier through a buffer amplifier, the enabling three point switching component being connected between an output of the buffer amplifier and the capacitor, the capacitor being connected to an output data line by a readout buffer amplifier and a readout three point switching component; a third point of the readout three point switching component receiving a readout enabling signal, and a pulse detection logic circuit receiving an output of the comparator component; the pulse detection logic circuit configured to provide the ring enable signal to the predetermined charge storage component wherein the AC coupled output is less than or equal to the predetermined threshold and configured to, when the AC coupled output is greater than the predetermined threshold, delay by a predetermined time and, after the predetermined time delay, disable the ring enable signal provided to the predetermined charge storage component. After the ring enable signal is disabled, a readout enabling signal is provided and charge in the capacitor in each predetermined charge storage component is multiplexed out to the output data line. After another predetermined time, after multiplexing out the charge stored in the capacitor in each predetermined charge storage component, the ring enable signal is reset to ring enable.

In one or more embodiments, the method of these teachings, for readout from a focal plane array having a number of pixels, includes, for each one pixel in the focal plane array, coupling an adaptive photodetector load circuit to a detector for the one pixel, the adaptive photodetector load circuit configured to suppress effects of low frequency variations incident on the detector, AC coupling a trans-impedance amplifier to the detector, providing AC coupled output of the trans-impedance amplifier, through a buffer amplifier to a predetermined capacitor in a sample and hold ring, a connection to the predetermined capacitor being enabled, comparing the AC coupled output of all of the trans-impedance amplifier to a predetermined threshold, disabling, after the predetermined time delay, the connection to the predetermined capacitor, when the AC coupled output of the trans-impedance amplifier is greater than the predetermined threshold, and multiplexing out charge in the predetermined capacitor to an output data upon receiving a readout enabling signal.

A number of other embodiments are also disclosed.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 1 is a schematic diagram of a circuit, for one pixel of a focal plane array, according to these teachings.

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

SAL receiver designs that can use large focal plane arrays without exceeding the cost and size limitations and that can use SAL receiver designs that can use large focal plane arrays without exceeding the cost and size limitations and that can enable the use of eye safe lasers are disclosed herein below.

In one or more embodiments, the readout circuit of these teachings, for readout from a focal plane array having a number of pixels, includes, for each one pixel in the focal plane array, an adaptive photodetector load circuit coupled to a detector for the one pixel, the adaptive photodetector load circuit having a frequency dependent circuit in parallel with a three point switching component, a third point of the three point switching component being connected to an intermediate point in the frequency dependent circuit, a voltage from the intermediate point to ground providing a switching voltage for the three point switching component, a trans-impedance amplifier, the detector being AC coupled to the trans-impedance amplifier, a comparator component, receiving an AC coupled output of the trans-impedance amplifier and comparing the AC coupled output to a predetermined threshold, a sample and hold ring comprising a number charge storage components connected in parallel, each one charge storage component comprising a capacitor in series with an enabling three point switching component, a third point of the enabling three point switching component receiving a ring enable signal, where a predetermined charge storage component is connected to the AC coupled output of the trans-impedance amplifier through a buffer amplifier, the enabling three point switching component being connected between an output of the buffer amplifier and the capacitor, the capacitor being connected to an output data line by a readout buffer amplifier and a readout three point switching component; a third point of the readout three point switching component receiving a readout enabling signal, and a pulse detection logic circuit receiving an output of the comparator component; the pulse detection logic circuit configured to provide the ring enable signal to the predetermined charge storage component wherein the AC coupled output is less than or equal to the predetermined threshold and configured to, when the AC coupled output is greater than the predetermined threshold, delay by a predetermined time and, after the predetermined time delay, disable the ring enable signal provided to the predetermined charge storage component. After the ring enable signal is disabled, a readout enabling signal is provided and charge in the capacitor in each predetermined charge storage component is multiplexed out to the output data line. After another predetermined time, after multiplexing out the charge stored in the capacitor in each predetermined charge storage component, the ring enable signal is reset to ring enable.

FIG. 1 shows a schematic diagram of a circuit, for one pixel of a focal plane array, according to one embodiment of these teachings. In one exemplary embodiment, used herein for illustration only and not a limitation of these teachings, the focal plane array is a 32×32 pixel array. For illustration purposes only, and not a limitation of these teachings, a laser waveform sampling of 100 MHz is used. Each of the pixels in the array, in this embodiment, has a circuit as shown in FIG. 1. In the embodiment shown in FIG. 1, an adaptive photodetector load circuit 15 is coupled to a detector for the pixel. The adaptive photodetector load circuit 15 has a frequency dependent circuit 25 in parallel with a three point switching component M1. A third point of the three point switching component M1 is connected to an intermediate point in the frequency dependent circuit 25, a voltage from the intermediate point to ground providing a switching voltage for the three point switching component. In one instance, the frequency dependent circuit 15 includes a resistor R1 in series with a load capacitor C1, the resistor R1 being connected to the detector output, the load capacitor C1 being connected to the resistor R1 and to ground. The third point of the three point switching component M1 is connected to a connection point between the resistor R1 and the load capacitor C1. The resistor R1 and the load capacitor C1 are selected in order to suppress effects of low frequency variations of the electromagnetic radiation incident on the detector. In one instance, the three point switching component M1 is a field effect transistor.

As shown in FIG. 1, the detector is AC coupled to a trans-impedance amplifier 35. In one instance, the feedback element 30 in the trans-impedance amplifier 35 is a current to voltage conversion resistor R2. In another instance, the feedback element 30 in the trans-impedance amplifier 35 is either a diode or a transistor. A comparator component 40 receives an AC coupled output of the trans-impedance amplifier and compares the AC coupled output to a predetermined threshold. In one instance, the comparator component 40 also receives especial offset adjustment for the one pixel. As also shown in FIG. 1, a sample and hold ring 55 having a number charge storage components connected in parallel, each one charge storage component including a capacitor 60 in series with an enabling three point switching component 62. A third point of the enabling three point switching component 62 receiving a ring enable signal, a predetermined charge storage component being connected to the AC coupled output of the trans-impedance amplifier 35 through a buffer amplifier 37, the enabling three point switching component 62 being connected between an output of the buffer amplifier 37 and the capacitor 60. The capacitor 60 is connected to an output data line by a readout buffer amplifier and a readout three point switching component 67, a third point of the readout three point switching component 67 receiving a readout enabling signal. In one instance, each one of the enabling three point switching component 62 and the readout three point switching component 67 is a field effect transistor.

The embodiment shown in FIG. 1 also includes a pulse detection logic circuit 45 receiving an output of the comparator component 40. The pulse detection logic circuit 45 is configured to provide the ring enable signal to the predetermined charge storage component wherein the AC coupled output is less than or equal to the predetermined threshold and is configured to, when the AC coupled output is greater than the predetermined threshold, delay by a predetermined time and, after the predetermined time delay, disable the ring enable signal provided to the predetermined charge storage component. (In one instance, the pulse detection logic circuit 45 is synthesized (generated automatically) from high-level software code that defines its functionality.) After the ring enable signal is disabled, a readout enabling signal is provided and charge in the capacitor 60 in each predetermined charge storage component is multiplexed out to the output data line. After another predetermined time, after multiplexing out the charge stored in the capacitor in said each predetermined charge storage component, the ring enable signal is reset to ring enable. The readout enabling, "ReadoutSH," signals, which are enabled sequentially to read out the sample/hold signals, would normally be located in a "column address" circuit that is outside the pixel. (In one embodiment, it could conceivably be located in the digital logic inside the pixel, but this is not preferred because it is unnecessary for it to be in the pixel and it would take up extra area in the pixel, and pixel area is limited.) The readout enabling, "ReadoutSH," signals are used in conjunction with row and column address circuits that sequentially address the rows and columns of pixels, and this circuitry would also normally be located in "row address" and "column address" circuits that are outside the pixel (the focal plane array).

Also included in the embodiment shown in FIG. 1 is a time of arrival recording component 65 configured to record, for the one pixel, a global counter timebase code that provides a time of arrival of a pulse at the one pixel. The global counter timebase code recorded in the time of arrival recording component 65 is read out when the charge in the capacitor each predetermined charge storage component is multiplexed out. After multiplexing out the charge stored in the capacitor 60 in each predetermined charge storage component, the global timebase counter is reset.

Most of the time the sensor is waiting for a pulse to arrive:—The "Pulse detection logic" keeps "RingEnable" enabled—The sample/hold ring is continuously being loaded in a circulating fashion (at 100 MHz in the illustrative exemplary embodiments), which provides a recent memory of signal amplitudes—No data is being read out or ADC converted When a large enough pulse arrives to exceed the threshold of the comparator:—The "Pulse detection logic" waits a few extra (10 ns in the illustrative exemplary embodiment ($=\frac{1}{100}$ MHz)) sample/hold intervals (to capture the full pulse shape), and then disables "RingEnable" which freezes the data held in the sample/hold ring.

In one instance, the detector for each one pixel responds to radiation at at least one of 1.06 μ or about 1.5 μ.

In one or more embodiments, the method of these teachings, for readout from a focal plane array having a number of pixels, includes, for each one pixel in the focal plane array, coupling an adaptive photodetector load circuit to a detector for the one pixel, the adaptive photodetector load circuit configured to suppress effects of low frequency variations incident on the detector, AC coupling a trans-impedance amplifier to the detector, providing AC coupled output of the trans-impedance amplifier, through a buffer amplifier to a predetermined capacitor in a sample and hold ring, a connection to the predetermined capacitor being enabled, comparing the AC coupled output of all of the trans-impedance amplifier to a predetermined threshold, disabling, after the predetermined time delay, the connection to the predetermined capacitor, when the AC coupled output of the trans-impedance amplifier is greater than the predetermined threshold, and multiplexing out charge in the predetermined capacitor to an output data upon receiving a readout enabling signal.

In one instance, the method of these teachings also includes recording, for each one pixel, a time of arrival of a pulse at the one pixel; the time of arrival being obtained from a code from a global timebase counter, and resetting the global timebase counter after the charge in the predetermined capacitor is multiplexed out.

In another instance, the method of these teachings also includes adjusting the predetermined threshold by a threshold offset adjustment for the one pixel.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It should be noted that, although embodiments of the readout circuit of these teachings have been described for a laser receiver, use of the readout circuit of these teachings for a wide range of electromagnetic sources is within the scope of these teachings.

Although these teachings have been described with respect to various embodiments, it should be realized these teachings are also capable of a wide variety of further and other embodiments within the spirit and scope of the appended claims.

What is claimed is:

1. A readout circuit for a focal plane array, the focal plane array comprising a plurality of pixels, the readout circuit comprising:
for each one pixel in the focal plane array:
an adaptive photodetector load circuit coupled to a detector for said one pixel; said adaptive photodetector load circuit comprising a frequency dependent circuit in parallel with a three point switching component, a third point of said three point switching component being connected to an intermediate point in the frequency dependent circuit, a voltage from the intermediate point to ground providing a switching voltage for the three point switching component; wherein said frequency dependent circuit comprises a resistor in series with a load capacitor, the resistor being directly connected to said detector output, the capacitor being connected to the resistor and to ground; a first point of the three point switching component being also connected to the detector; a third point of said three point switching component being connected to a connection point between the resistor and the load capacitor; a second point of said three point switching component being also connected to ground; the resistor and the load capacitor being selected in order to suppress effects of low frequency variations of the electromagnetic radiation incident on the detector;
a trans-impedance amplifier; the detector being AC coupled to the trans-impedance amplifier;
a comparator component, receiving an AC coupled output of said trans-impedance amplifier and comparing said AC coupled output to a predetermined threshold;
a sample and hold ring comprising a number of charge storage components connected in parallel; each one charge storage component comprising a capacitor in series with an enabling three point switching component; a third point of the enabling three point switching component receiving a ring enable signal; a predetermined charge storage component connected to the AC coupled output of the trans-impedance amplifier through a buffer amplifier; the enabling three point switching component being connected between an output of the buffer amplifier and the capacitor; the capacitor being connected to an output data line by a readout buffer amplifier and a readout three point switching component; a third point of the readout three point switching component receiving a readout enabling signal; and a pulse detection logic circuit receiving an output of the comparator component; the pulse detection logic circuit configured to provide the ring enable signal to the predetermined charge storage component wherein said AC coupled output is less than or equal to the predetermined threshold and configured to, when said AC coupled output is greater than the predetermined threshold, delay by a predetermined time and, after the predetermined time delay, disable the ring enable signal provided to the predetermined charge storage component;

wherein, after the ring enable signal is disabled, a readout enabling signal is provided and charge in the capacitor in each predetermined charge storage component is multiplexed out to the output data line; after another predetermined time, after multiplexing out the charge stored in the capacitor in said each predetermined charge storage component, the ring enable signal is reset to ring enable.

2. The readout circuit of claim 1 further comprising a time of arrival recording component receiving an output from the pulse detection logic circuit and receiving an output of a global fast counter, the time of arrival recording component being configured to record, for said each one pixel, a global counter timebase code that provides a time of arrival of a pulse at said each one pixel; the global counter timebase code recorded in said time of arrival recording component being read out, when the charge in the capacitor said each predetermined charge storage component is multiplexed out; after multiplexing out the charge stored in the capacitor in said each predetermined charge storage component, the global timebase counter is reset.

3. The readout circuit of claim 1 wherein the detector for said each one pixel responds to radiation at at least one of 1.06 μ or about 1.5 μ.

4. The readout circuit of claim 1 wherein a feedback element in the trans-impedance amplifier is a current to voltage conversion resistor.

5. The readout circuit of claim 1 wherein a feedback element in the trans-impedance amplifier is one of a diode or a transistor.

6. The readout circuit of claim 1, where in the comparator component also receives a threshold offset adjustment for said one pixel.

7. The readout circuit of claim 1 wherein the three point switching component comprises a field effect transistor.

8. The readout circuit of claim 1 wherein each one of the enabling three point switching component and the readout three point switching component comprises a field effect transistor.

9. A method for reading out a focal plane array, the focal plane array comprising a plurality of pixels, the method comprising, for each one pixel in the focal plane array:

coupling an adaptive photodetector load circuit to a detector for said one pixel, the adaptive photodetector load circuit configured to suppress effects of low frequency variations incident on the detector; wherein the adaptive photodetector load circuit comprises a frequency dependent circuit in parallel with a three point switching component, a third point of said three point switching component being connected to an intermediate point in the frequency dependent circuit, a voltage from the intermediate point to ground providing a switching voltage for the three point switching component; wherein said frequency dependent circuit comprises a resistor in series with a load capacitor, the resistor being directly connected to said detector output, the capacitor being connected to the resistor and to around; a first point of the three point switching component being also connected to the detector; a third point of said three point switching component being connected to a connection point between the resistor and the load capacitor; a second point of said three point switching component being also connected to ground; the resistor and the load capacitor being selected in order to suppress effects of low frequency variations of the electromagnetic radiation incident on the detector;

AC coupling a trans-impedance amplifier to the detector; the resistor being connected to the detector output providing AC coupled output of the trans-impedance amplifier, through a buffer amplifier, to a predetermined capacitor in a sample and hold ring; a connection to the predetermined capacitor being enabled;

comparing the AC coupled output of the trans-impedance amplifier to a predetermined threshold;

disabling, after the predetermined time delay, the connection to the predetermined capacitor, when the AC coupled output of the trans-impedance amplifier is greater than the predetermined threshold; and multiplexing out charge in the predetermined capacitor to an output data upon receiving a readout enabling signal.

10. The method of claim 9 further comprising:

recording, for said each one pixel, a time of arrival of a pulse at said each one pixel;

the time of arrival being obtained from a code from a global timebase counter; and resetting the global timebase counter after the charge in the predetermined capacitor is multiplexed out.

11. The method of claim 9 further comprising adjusting the predetermined threshold by a threshold offset adjustment for said one pixel.

12. The method of claim 9 wherein the detector for said each one pixel responds to radiation at at least one of 1.06 μ or about 1.5 μ.

13. The method of claim 9 wherein the three point switching component comprises a field effect transistor.

* * * * *